United States Patent [19]

Gerst et al.

[11] E Patent Number: Re. 31,772

[45] Reissued Date of Patent: Dec. 18, 1984

[54] DIGITAL BEARING INDICATOR

[75] Inventors: Carl W. Gerst, Skaneateles; Hugh A. Hair, Fayetteville; Stig L. Rehnmark, Skaneateles, all of N.Y.

[73] Assignee: Anaren Microwave, Incorporated, East Syracuse, N.Y.

[21] Appl. No.: 341,914

[22] Filed: Jan. 22, 1982

Related U.S. Patent Documents

Reissue of:

[64] Patent No.: 4,203,114
Issued: May 13, 1980
Appl. No.: 960,243
Filed: Nov. 13, 1978

[51] Int. Cl.[3] ..... H04B 7/00
[52] U.S. Cl. ..... 343/373
[58] Field of Search ..... 343/100 SA, 100 CL, 343/854, 113 R

[56] References Cited

U.S. PATENT DOCUMENTS

| | | | |
|---|---|---|---|
| 3,474,446 | 10/1969 | Shestag et al. | |
| 3,935,575 | 1/1976 | Leisterer et al. | 343/113 R |
| 3,946,395 | 3/1976 | Kirchhoff | 343/113 R |
| 4,103,304 | 7/1978 | Burnham et al. | 343/113 R |

FOREIGN PATENT DOCUMENTS 2220111 9/1974 France .

OTHER PUBLICATIONS

*Interferometric Receive Techniques*, Anaren Microwave Inc., Syracuse, NY, Jan. 1971, pp. 1–56.

1974 International IEEE/AP-S Symposium, Jun. 10, 1974, Lewis et al., *A Broadband Stripline Array Element*, pp. 335–337.

IEEE International Convention Record, vol. 14, No. 5, W. Waltman et al., *A Broadband Interferometer*, pp. 156–166.

IEEE Transactions on Antennas and Propagation, vol. AP-21, No. 2, Mar. 1973, B. Sheleg, *Butler Submatrix Feed Systems for Antenna Arrays*, pp. 228 & 229.

*Primary Examiner*—Theodore M. Blum
*Attorney, Agent, or Firm*—Hane, Roberts, Spiecens & Cohen

[57] ABSTRACT

Apparatus for digitally indicating the bearing angle of a source of microwave energy includes an antenna array of a plurality of antenna elements equispaced about an arc of a circle in a plane. Connected to each of the antenna elements is a different input port of a microwave power dividing and phase transforming hybrid matrix. Some of the output ports of the matrix are connected to input ports of a plurality of digital phase discriminators whose outputs emit a coded combination of binary level signals. The outputs of the phase discriminators are connected to an ambiguity resolving means which transform the binary level signals to an unambiguous digital word representing the bearing angle.

27 Claims, 8 Drawing Figures

BEARING INDICATOR SYSTEM

FIG. 1 BEARING INDICATOR SYSTEM

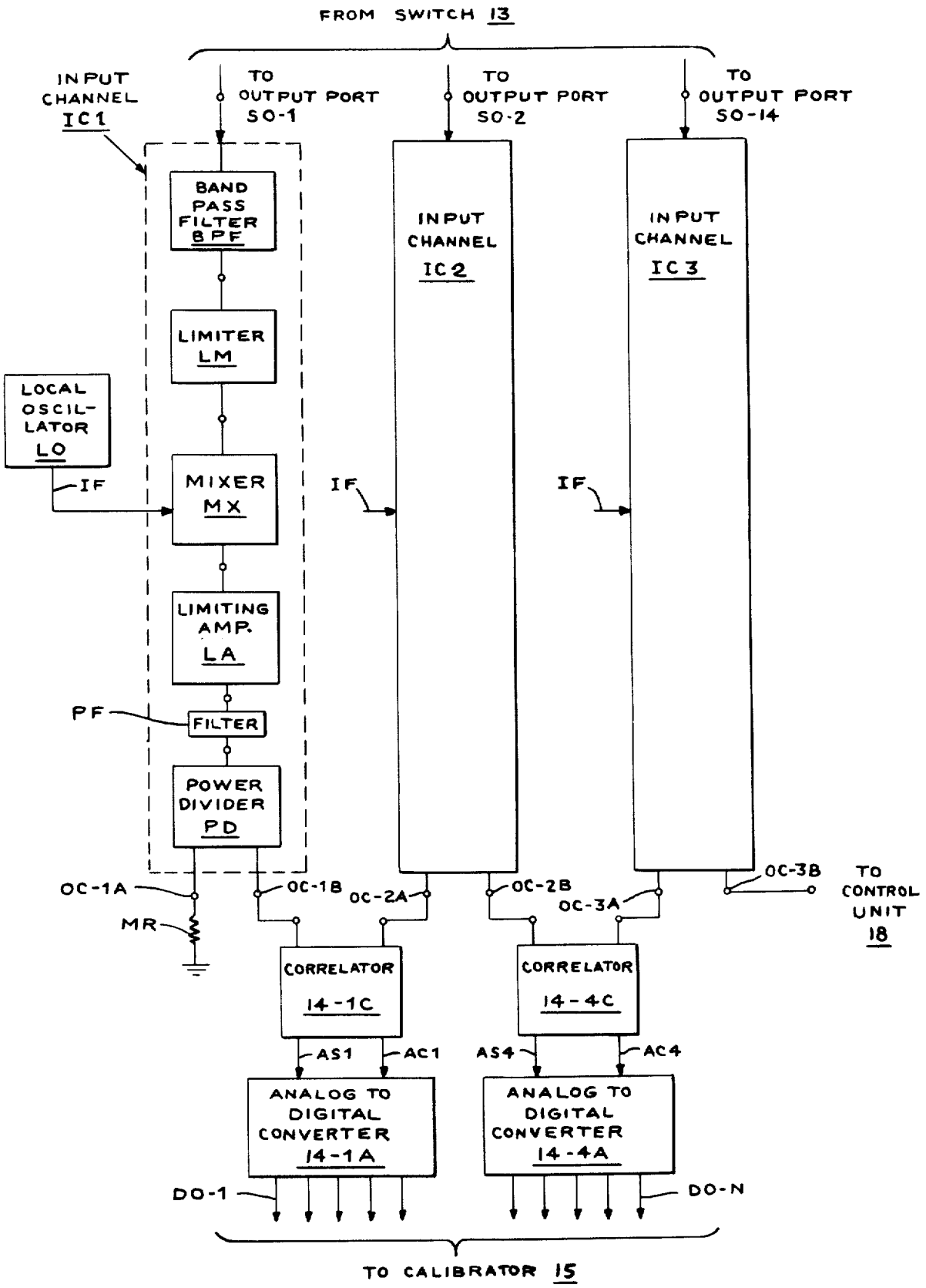
FIG. 4 PHASE COMPARATORS 14

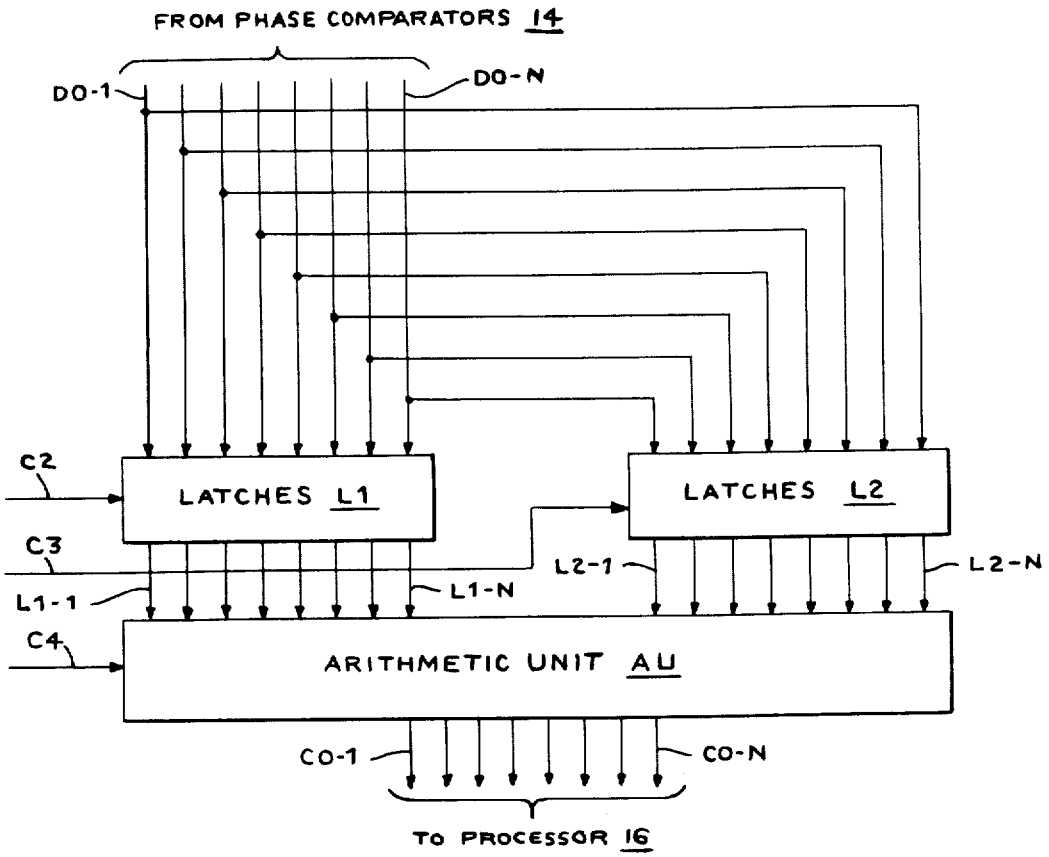
FIG. 5 CALIBRATOR 15
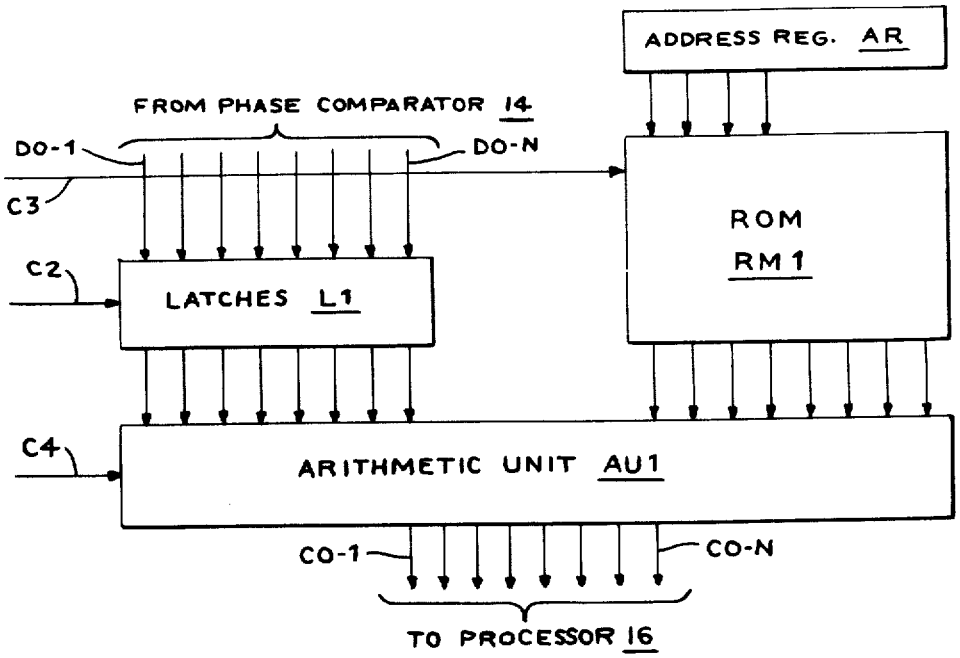
FIG. 6 CALIBRATOR 15A

DIGITAL BEARING INDICATOR

Matter enclosed in heavy brackets [ ] appears in the original patent but forms no part of this reissue specification; matter printed in italics indicates the additions made by reissue.

BACKGROUND OF THE INVENTION

This invention pertains to azimuth- or -bearing indicators and more particularly to apparatus for presenting a digital indication of the bearing angle of a remote source of microwave power.

There are many instances where it is necessary to know at a site the bearing angle of a remote source of microwave power. For instance, ships quite often need to know the position of other ships in fog or at night, particularly, when the other ships are hunting targets by means of search radar. Similar situations arise between airplanes and radar guided missles. Existing systems performing a similar function consist of a circular array of elements (usually cavity-backed spirals) with carefully matched radiation patterns, amplitude tracking log-video detectors, and the angle of arrival is interpolated by comparing the relative amplitudes of the receive channels. The bearing resolution of this type of discriminator is poor, especially considering frequency response which depends on precise amplitude tracking of the elements and the log-video receivers versus frequency.

Other such bearing angle indicators required rotating antennas wherein the instantaneous angular position of the antenna was used in determining the bearing of a microwave power source. It should be apparent that rotating antennas are not only unreliable but because of their mechanical configuration add complexity, weight and bulk to the system. In addition the rotating antenna is also quite slow, typically of the order of 1 revolution per second, and covers only a very small angle at any instant of time.

There have been proposals for instantaneous bearing monitors using fixed (non-rotating) antennas comprising four radiators connected via a 4-input, 4-output Butler matrix to a two-input phase discriminator whose output feeds a cathode ray tube display. Such systems can only give coarse bearing indications because of inherent errors in the system. There are proposals for devices using more than four radiators. However, such devices are concerned with linear arrays which cannot scan more than 180° of azimuth range.

SUMMARY OF THE INVENTION

It is a general object of the invention to provide an improved azimuth angle or bearing indicator utilizing a non-rotating antenna which has unusually good resolution, fast time response, and the full 360 degree coverage.

Briefly, the invention contemplates apparatus for digitally indicating the bearing of a source of microwave energy having an antenna array with N antenna elements equispaced about an arc of a circle for receiving the microwave energy from the source. The N input ports of a microwave power dividing and phase transforming means are connected to the N antenna elements respectively. Different pairs of the output ports of the microwave power dividing and phase transforming means are connected to the two-input ports of several phase comparator means. The outputs of the phase comparator means yield in parallel a coded combination of binary level signals which are fed to a ambiguity resolver to yield a digital representation of the bearing angle.

DESCRIPTION OF THE DRAWING

Other objects, the features, and advantages of the invention will be apparent from the following detailed description when read with the accompanying drawing which shows by way of example and not limitation the presently preferred embodiment of the invention. In the drawing:

FIG. 4 is a logic diagram of the phase comparators of the system of FIG. 1;

FIG. 5 is a logic diagram of one embodiment of the calibrator of FIG. 1;

FIG. 6 is a logic diagram of another embodiment of the calibrator of FIG. 1;

Figure 1:
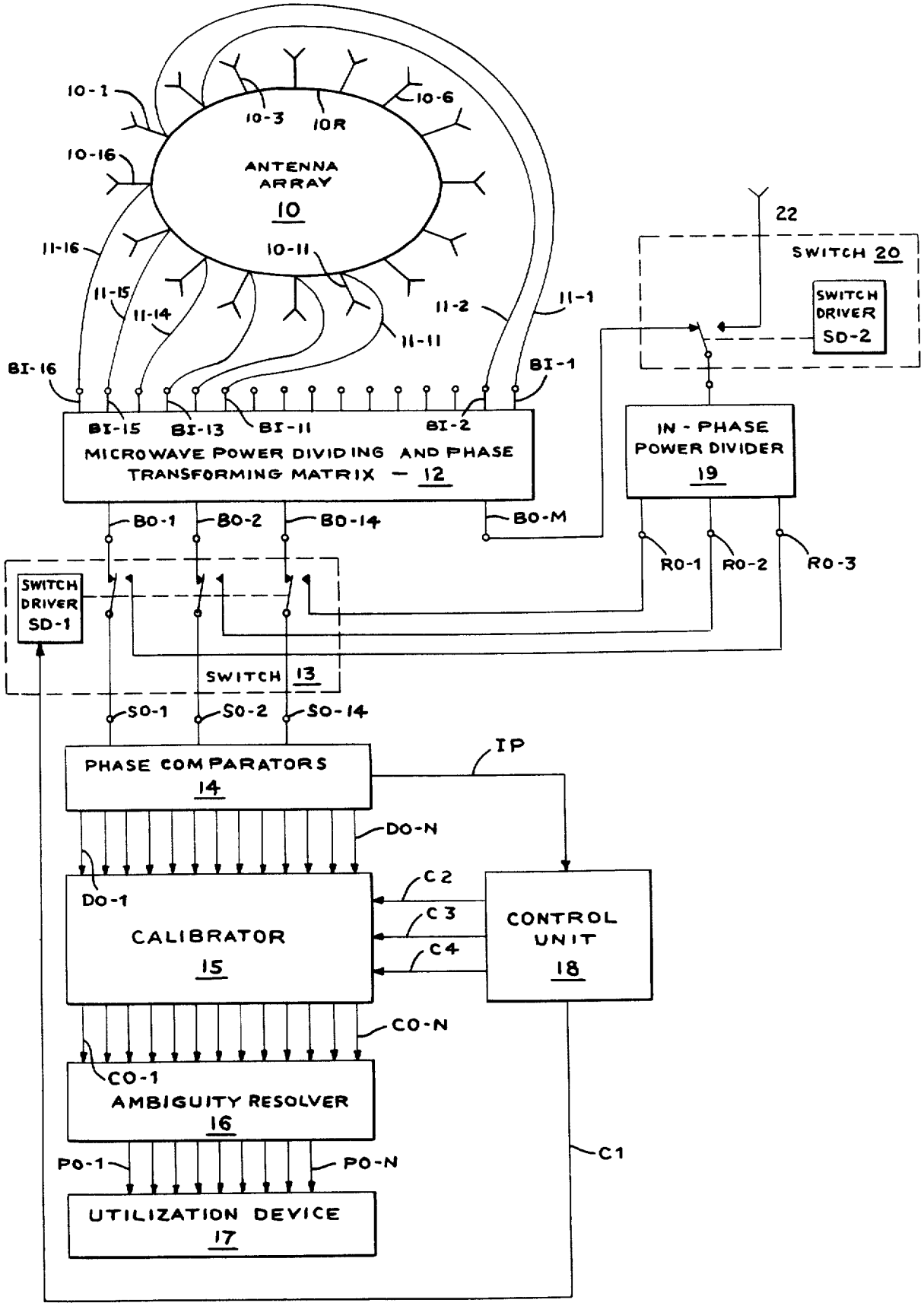
FIG. 1 is a block diagram of a direction finding system in accordance with the invention.

7 is a logic diagram of the control unit of FIG. 1; and

Figure 8:
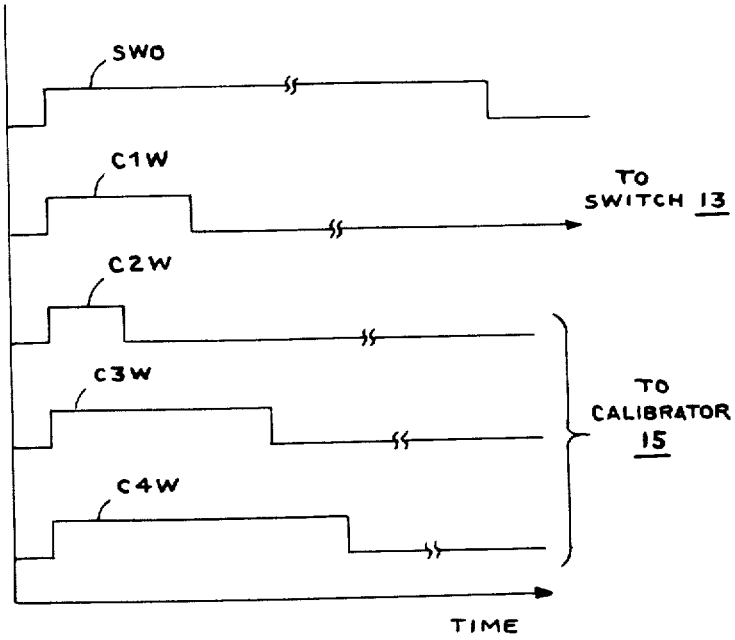

FIG. 8 are waveforms to show the timing of the control unit.

DESCRIPTION OF THE PREFERRED EMBODIMENT

In FIG. 1 the direction finding system for digitally indicating the bearing angle of a source of microwave energy has a 360° azimuthal coverage and includes: the N-element antenna array 10 for receiving microwave energy; the microwave power dividing and phase transforming matrix 12; the switch 13; the phase comparators 14; the calibrator 15; the ambiguity resolver 16; the utilization device 17; the control unit 18; the inphase power divider 19; switch 20; and omni antenna 22.

The antenna array 10 comprises sixteen identical antenna elements 10-1 to 10-16 arrayed along the periphery of a circle in the horizontal plane and constructed to predominantly radiate energy radially with a moderate component in directions normal to the plane of the circle. In particular, the antenna elements are equispaced about the circle 10R with the element 10-16 considered to be at the 0° azimuth angle. Note the use of 16 elements is preferred. The number should however be at least four.

Figure 2:
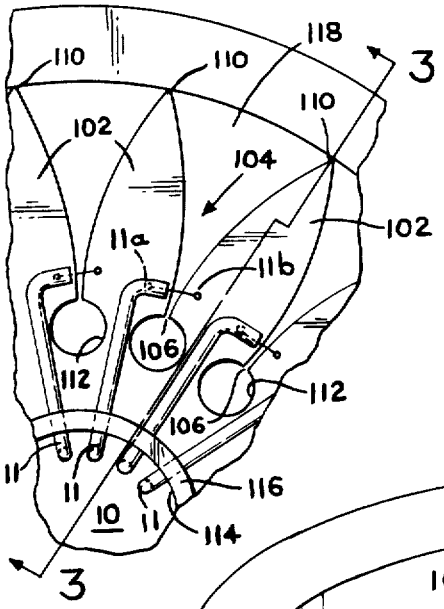
FIG. 2 is a plan view of an antenna array having slot elements used in the system of FIG. 1.
Figure 3:
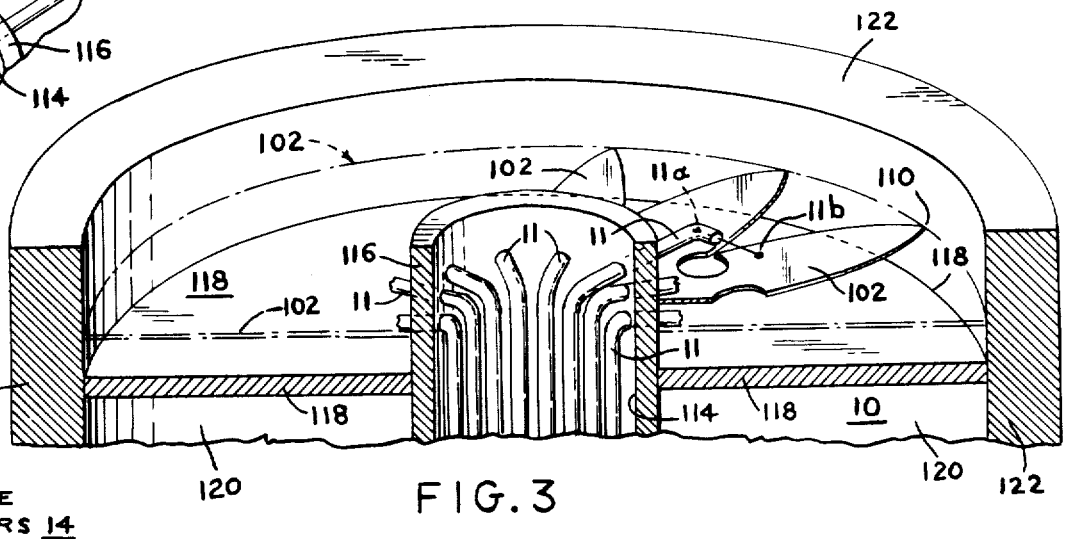
FIG. 3 is a cross-sectional view taken along the line 3—3 of FIG. 2.

While there could be used conventional dipole elements, or cavity backed spirals, or multifilar helices, or slots extending peripherally around a cylindrical conductor, it is preferred to use the antenna array of FIGS. 2 and 3.

The antenna array 10 as shown in FIGS. 2 and 3 is built from a circular disk 102 of conductive material having a plurality of slot elements radially extending from feed points about an intermediate circle. A typical slot element 104 extends from feed point 106. At the feed point 106 one wall of the slot is connected to the outer conductor 11a of a coaxial line 11 and the other wall is connected to the central conductor 11b of the line 11. While coaxial conductors are used, the invention also contemplates the use of slot conductors, strip line or microstrip line. The width of the typical slot 104 monotonically increases from a minimum width at the feed point to a maximum width at the periphery of the disk. The tapering increase in width is preferably chosen so that the walls of adjacent slots meet at peripheral points such as point 110. Behind each feed point there is a high impedance means 112 preferably in the form of a circular opening having a diameter colinear with the axis of the slot and having a circumference approximately larger than one half of an operating wavelength.

The disk is provided with a central opening 114. Abutting the periphery of the disk 102 is a hollow cylinder 116. This cylinder is preferably a conductor in order to provide a ground plane. However, in some instances it may be desirable to make the cylinder of a microwave energy absorber. It is also preferable to place a disk 118 of such absorber between the disk 102 and the component housing 120. In order to insure that any linearly polarized wave will be received it is preferred to position about the peripheral edge of disk 102 the circular to linear polarizer 122.

Each of the antenna elements 10-1 to 10-N is connected via its own coaxial cable 11-1 to 11-16 to the respective input port BI-1 to BI-16 of the power dividing and phase transforming matrix 12. It should be noted that the cable length between an antenna element and an input port must be the same for every port, otherwise any differences would introduce relative phase shifts among the signals and distort the results.

The microwave power dividing and phase transforming matrix 12 has the following properties.

All ports are isolated from each other. If there are N input ports and N output ports, then a signal fed into any one of the output ports will be divided equally between the N input ports and there will be a uniform phase slope across the N input ports which is proportional to the position number of the input ports.

It can be shown that the input to the ith output port of the matrix will excite the ith mode at the input ports which is given by the following equation:

$$E_i = \frac{1}{\sqrt{N}} \begin{vmatrix} e^{ki} \\ e^{2ki} \\ e^{3ki} \\ \cdots \\ \cdots \\ \cdots \\ e^{(N-1)ki} \\ e^{Nki} \end{vmatrix}$$

where i = the input port number;

N = the total number of input ports, $$k = j\left(\frac{2\pi}{N}\right);$$

and $$j = \sqrt{-1}$$

Thus, it can be shown for a 16-input port, 16-output port matrix the phases associated with the input ports for the first two modes would be according to the following table:

TABLE I

| Input Port | First Mode | Second Mode |
|---|---|---|
| 1 | 22.5° | 45° |
| 2 | 45° | 90° |
| 3 | 67.5° | 135° |
| 4 | 90° | 180° |
| ' | ' | ' |
| ' | ' | ' |
| a | a · (22.5)° | a · (45)° |
| a + 1 | (a + 1) · (22.5)° | (a + 1) · (45)° |
| ' | ' | ' |
| ' | ' | ' |
| 15 | 337.5° | 315° |
| 16 | 360° | 360° |

The first thing to note is that input port 16 has the same phase shift for both modes. In fact, it would have the same phase shift for every mode. Thus, the position of the antenna element connected to this port is preferably the reference position from which azimuth angles are measured. However, it is possible to introduce a constant phase shift at one of the outputs without degrading the overall performance. For example, if a 180° phase shift were added at output port 1, the system would still work. But the new reference would be the antenna element connected to the input port number 8.

Due to reciprocity of the power dividing and phase transforming matrix a signal at one input port will get a "phase tag" which is measured at the output ports. Thus it is possible to tell from which input port a signal is coming by observing the phase at the output ports.

An incoming signal will be received by more than one antenna element and it can be shown that to a good first approximation, that a signal coming in at an angle $\theta$ will emit a signal at the output port b according to the following equation $$R_b = Ae^{jb\theta}$$

where A = a constant, and $j = \sqrt{-1}$. The important thing to note is that between adjacent output ports the phase difference equals the azimuth angle. In general, the phase difference between the signals at any two output ports (b) and (b-c) is $c\theta$. For a further discussion including how to construct such matrices see my U.S. Pat. Nos. 3,731,217 and 3,517,309.

In some instances, it may not be possible to mount an antenna with a 360° field of view. In such instance some of the antenna elements can be disconnected from the power dividing and phase transforming matrix. The corresponding input ports to the matrix are terminated. One such instance is an antenna mounted in the tip of a wing of an aircraft. If the tip of the wing is defined as the zero degree bearing angle, elements equispaced from +135° to −135° will provide coverage from approximately +90° to −90°. A system of this type mounted in each of two wing tips would provide 360° coverage.

Instead of terminating some of the input ports of the power dividing and phase transforming matrix when less than a 360° field of view is desired, each input port can be connected to an antenna element, all the antenna elements being equispaced about an arc of a circle less than 360°. In this case the measured phase between pairs of output ports still is a measure of bearing angle but the ratio between measured phase and bearing angle is not an integer.

On the other hand, a mounting location near the top of a mast of a ship could accomodate a full circle with a 360° coverage.

It should be noted that many of the output ports are terminated within the matrix and never are visible output ports.

Before discussing the switch 13 it is more instructive to talk about the phase comparators 14 and to assume the phase comparators 14 are directly connected to the output ports of the matrix 12. The phase comparators 14 comprise a set of digital phase discriminators. The number of digital phase discriminators determine the resolving power of the system. One digital phase discriminator can give a phase angle to perhaps seven bits. Each additional digital phase discriminator increases the resolving power. In the present example there will be two digital phase discriminators to eventually yield an eight bit phase angle representation. Each digital phase discriminator means measures the phase difference between two signals at its inputs which via switch 13 are connected to output ports of matrix 12. This phase difference will have a value that changes k times the change in the bearing angle, where k is a positive or negative integer. It is possible to connect two digital phase discriminators so that such phase difference at the inputs to one of them is a direct measure of the bearing angle. There is however an error depending on (among other things) N, the number of antenna elements. By using more output ports from the power dividing and phase transforming matrix, it is possible to reduce the error to a high extent. For instance, pairs of ports with $k=4$, 8, etc., . . . have been found useful. Several port combinations with different values of the integer k are used. A high value of k is used to reduce the bearing angle error and a low value of k to remove ambiguities.

Thus, for the present example, since there are only two digital phase discriminators in the phase comparators 14, it should be apparent that one need only three channels respectively connected to output ports of matrix 12. Hence, by way of example, the channels will be connected to output ports BO-1, BO-2 and BO-14 One of the digital phase discriminators will compare the signals from ports BO-1 and BO-2 to give $k=1$, a low value for ambiguity resolving; the other of the digital phase discriminators will compare the signals from ports BO-2 and BO-14 to give $k=4$, a high value, to minimize the bearing angle error. Note, any values of k will work provided the two values are not equal and are also relatively prime.

The output of the phase comparators 14 on the terminals DO-1 to DO-N are a coded combination of binary level signals representing the bearing angle, however, with ambiguity. Therefore, it is necessary to further process the binary level signals to resolve any such ambiguities.

Thus, ignoring for the present the calibrator 15, the output terminals DO-1 to DO-N of the phase comparators 14 are fed via the calibrator 15 to inputs of ambiguity resolver 16. After processing, an unambiguous binary number in the form of a coded combination of eight bits representing the bearing angle is fed from terminals PO-1 to PO-8 to a utilization device 17. Device 17 can be a numerical display device or even a digital computer which further processes this data along with other data such as range, elevation, etc. received from other devices.

In some realizations of the bearing indicator system each used output port from the matrix 12 is connected via a channel including limiting amplifiers and a length of transmission line to the digital phase discriminators in the phase comparators. The phase differences between the output signals from the matrix 12 are essentially frequency independent which is important for the use of the system. To eliminate the need for phase tracking of each channel a calibrating scheme is used. The output of an omni-directional antenna or an output signal from the matrix 12 is divided in an equiphase, equiamplitude signal for each limiting amplifier/transmission line path. The readings of the phase comparators 14 then give the differences in insertion phase between the different paths. This phase difference is then subtracted from the bearing angle reading that is made.

In particular, there is provided a conventional in-phase power divider 19 which receives a reference signal and transmits this reference signal in parallel from three output ports RO-1, RO-2, and RO-3. In practice the reference signal will be obtained either from an omni-directional antenna 22 or from an output port BO-M of the matrix 12. Switch 20 is shown to indicate the options for the source of the reference signal.

In any event there is provided switch 13 which has three microwave single-pole double-throw switches whose ganged "movable contacts" are connected via the respective output ports SO-1, SO-2 and SO-14 to the respective three channels in the phase comparator 14. One fixed contact of each switch is connected to one of the output ports of matrix 12 and the other input port of each switch is connected to one of the output ports of power divider 19. Switch driver SD, in response to signals on line C1, causes the "movable contact" to alternate positions. Thus, when the switch 13 is in the position shown the uncalibrated ambiguous binary representation of the bearing angle is loaded into the calibrator 15 in response to a signal on line C2 from control unit 18; and when the switch is in the other position a binary representation of a zero reference angle is loaded into the calibrator 15 in response to a signal on line C3 from control unit 18. Then, the second representation is subtracted from the first representation by calibrator 15 in response to a signal on line C4 from control unit 18 causing calibrator 15 to transmit a calibrated but ambiguous binary representation of the bearing angle to ambiguity resolver 16.

Now, the basic units of the system will be described in further detail.

In FIG. 4 the phase comparators 14 are shown comprising: three input channels IC1, IC2, and IC3 receiving signals from ports SO-1, SO-2 and SO-14 of switch 13; two-input port correlators 14-1C and 14-4C trigonometrically phase comparing signals from channels IC1 and IC2, and from IC2 to IC3 respectively; and analog signal processors 14-1A and 14-4A converting the analog signals on line AS1 and AC1 and the analog signals on line AS4 to AC4, respectively, to a coded combination of binary level signals on line DO-1 to DO-N.

The input channels can take two forms. In the form shown in FIG. 4 the actual phase comparisons are done at an intermediate frequency. In such case there is no need to perform any calibrations. Thus, in the system there would be no need for switch 13, power divider 19 and circuitry associated therewith, calibrator 15 and control unit 18. However, it has a limited bandwidth.

In using the intermediate frequency techniques each channel comprises, connected in the recited order, a band pass filter BPF tuned to the operating bandwidth of the system; a limiter LM feeding a mixer MX which receives the mixing signal on line IF of local oscillator LO; a limiting amplifier LA, a post band pass filter PF; and an in-phase power divider PD which feeds the same phase signal to two output terminals OC-1A and OC-1B. When using direct radio frequency techniques, limiter LM is connected directly to limiting amplifier LA and the mixer MX and local oscillator LO are not required. The use of radio frequency techniques permits sensing for wider bandwidths of radar pulses.

The correlator 14-1C receives the signals from output ports OC-1B and OC-2A channels IC1 and IC2 which are connected to adjacent output ports of the matrix 12 at its inputs and transmits a signal proportional to sin $\theta$ from its output AS1 and proportional to cos $\theta$ from its output AC1, where $\theta$ is the phase difference between the received signals (the bearing angle).

Suitable correlators can be found in U.S. Pat. No. 3,800,221 at FIG. 2.

The signals on lines AS1 and AC1 are fed to analog-to-digital converter 14-1A. The analog to digital converter 14-1A provides an n-bit digital representation on the lines DO-1 of the relative phase of the inputs to the correlator 14-1C. Such analog-to-digital converters are well known in the art. The correlator 14-4C and analog signal processor 14-4A are the same except they operate on the phase differences of the signals from farther spaced output ports.

The calibrator 15 as shown in FIG. 5 comprises: the sets of latches L1 and L2 having information inputs connected in parallel to the outputs D0-1 to D0-N of the phase comparators 14, gating inputs connected to lines C2 and C3 respectively, and outputs connected to the lines L1-1 to L1-N and lines L2-1 and L2-N, respectively; and arithmetic unit AU, operating as a subtractor, having minuend inputs connected to lines L1-1 to L1-N, subtrahend inputs connected to lines L2-1 to L2-N, result outputs connected to terminals C0-1 to C0-N, and a control input connected to line C4. It will be assumed the latches and arithmetic unit operate on trailing edge triggers. At the end of the pulse on line C2 the binary level signals on terminals D0-1 to D0-N associated with the uncalibrated angle being measured are loaded into latches L1. At the end of the signal on line C3, the binary level signals now on terminals D0-1 to D0-N representing the phase corrections are loaded into latches L2. At the end of the signal on line C4, arithmetic unit AU subtracts the contents of latches L2 from the contents of latches L1 to produce a calibrated value at terminals C0-1 to C0-N.

In FIG. 6 another calibrator 15A is shown which requires no switching of inputs. Thus, in FIG. 1, there is no need for switch 13, switch 20, antenna 22 and in-phase power divider 19. Instead, the input ports of the phase comparators 14 are connected directly to the output ports of matrix 12. In addition, digital values representing calibration corrections are stored in a ROM-type memory RM1. The corrections can be related to different operating frequencies, initial calibrations or the like. The desired calibration value is selected by entering the appropriate register address in address register AR. The selection can be static or dynamic. Except for this difference and the fact that the signal on line C3 controls the reading of the contents of the selected register to give the subtrahend value calibrator 15A operates in the same manner as calibrator 15 of FIG. 5. In further embodiments of the system one could use both calibrators in cascade with calibrator 15 taking care of phase errors in the phase comparators and calibrator 15a for taking care of other system errors.

Ambiguity resolver 16 can take several forms. It can be a ROM-type memory wherein the binary level signals address registers in the memory wherein each register stores the statically true value of the angle associated with the ambiguous value represented by the binary level signals. Information for the implementation of this type of processor is known to those skilled in the art. Although this is the preferred realization of the process 16 one could equally use the correction logic shown in FIGS. 5 and 6 of said U.S. Pat. No. 3,800,221.

Figure 7:
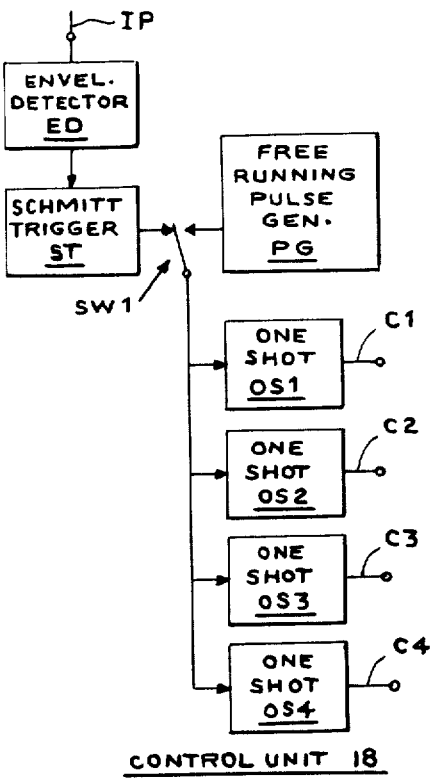

In FIG. 7 there is shown the control unit 18 which essentially generates the timing sequence. If periodic sampling is desired the movable contact of switch SW1 is connected to free running pulse generator PG. Each time the pulse generator PG generates a pulse such as that shown as waveform SWO of FIG. 8, the leading edge of that pulse triggers each of the one shots OS1 to OS4 which generate pulses having the relative durations shown by waveforms C1W to C4W respectively.

For triggered sampling, switch SW1 is moved to the position shown in FIG. 7 to be connected to the output of Schmitt trigger ST whose input is connected to envelope detector ED. Whenever a microwave energy pulse is received and passed through the phase comparators 14 a sample of that pulse is fed via conductor IP to envelope detector ED which emits a pulse to Schmitt trigger ST. Such pulse is shown on waveform SWO of FIG. 8.

What is claimed is:

[1. Apparatus for generating a representation of the bearing of a source of microwave energy comprising: an antenna array means having N antenna elements equispaced about an arc of a circle greater than 180° in a plane for receiving microwave energy, where N is an integer; microwave power dividing and phase transforming means having N input ports and a set of output ports, first connecting means for connecting each of the N input ports to a different one of said antenna elements; n two-input port phase comparator means, each of said phase comparator means giving an indication of the phase difference between the signals arriving at their respective input ports, n being an integer greater than 1 and less than N/2; second connecting means for connecting the input ports of each of said phase comparator means to a different pair of output ports of said microwave power dividing and phase transforming means; and ambiguity resolving means connected to said n phase comparator means for processing said indications of the phase differences to give a multidigit representation of the bearing of a source of microwave energy.]

[2. The apparatus of claim 1 wherwei N is greater than 4.]

3. The apparatus of claim [1] *32* wherein N is at least 8 and said microwave power dividing and phase transforming means has at least 8 input ports and at least 3 of said output ports being connected to said second connecting means, the phase difference between the signals at a pair of the output ports connected to said second connecting means is approximately equal to p times the bearing angle, and the phase difference between the signals at another pair of the output ports connected to said second connecting means is approximately equal to q times the bearing angle, where p and q are constants.

4. The apparatus of claim 3 wherein p does not equal q and both p and q are integers and relatively prime.

5. The apparatus of claim 4 wherein: $p=1$; $q=4$; and $N=16$.

6. The apparatus of claim [1] *32* wherein said antenna array means comprises a plurality of N antenna elements equispaced about a circle in a plane for receiving microwave energy.

7. The apparatus of claim [1] *32* or 6 wherein each of said antenna elements is a slot antenna.

8. The apparatus of claim 7 wherein said slot antenna is a notch antenna.

9. The apparatus of claim [1] *32* or 4 wherein said antenna array means comprises a disk of conductive material, said disk having a plurality of slots, each of said slots extending radially outward from a different point displaced from the center of the disk to the periphery thereof, the width of each slot monotonically increasing from the point to the periphery of the disk and means at each of the points for accepting microwave energy arriving in the slot from the periphery of the disk.

10. The apparatus of claim 9 further comprising conductive ground plane means positioned between each point and the center of the disk.

11. The apparatus of claim 9 further comprising microwave energy absorbing means positioned between each point and the center of the disk.

12. The apparatus of claim 9 further comprising microwave energy absorbing means positioned in a plane on one side of the disk.

13. The apparatus of claim [1] *32* or 4 wherein each of said phase comparator means comprises a two input-port correlator means, a servo-to-digital converter means connected to the output of said correlator means, and active connecting means for connecting said second connecting means to the input ports of said correlator means.

14. The apparatus of claim 13 wherein said active connecting means comprises bandpass amplifier means.

15. The apparatus of claim 13 wherein said active connecting means comprises mixer means having information-signal input means connected to said second connecting means, output means connected to the input ports of said correlator means and mixing signal input means, and local oscillator means for generating a mixing signal connected to said mixing signal input means.

16. The apparatus of claim [1] *32* or 3 or 4 or 5 wherein each of said phase comparator means comprises means for generating a coded combination of binary level signals.

[17. The apparatus of claim 16 wherein said ambiguity resolving means comprises means for converting coded combinations of binary level signals received in parallel from all of said phase comparator means into a binary representation of the bearing of the source of microwave energy.]

[18. The apparatus of claim 17 further comprising a source of a calibrating signal and wherein said ambiguity resolving means further comprises calibrating means responsive to said source of calibrating signals for initially modifying the coded combinations of binary level signals in accordance with the phase errors.]

19. The apparatus of claim [18] *32* wherein said calibrating means comprises a source of a calibrating signal, a controlled switching means for alternately connecting ports of said second connecting means to the inputs of said phase comparator means, first storing means for storing the coded combinations of binary level signals generated by said phase comparator means when said switching means is in a first position, second storing means for storing the coded combination of binary level signals generated by said phase comparator means when said switching means is in the alternate position, and arithmetic means for modifying the contents of said first storing means in view of the contents of said second storing means to produce a further coded combination of binary level signals.

20. The apparatus of claim [18] *32* or 19 wherein said source of a calibrating signal is another antenna means.

21. The apparatus of claim [18] *32* or 19 wherein said source of a calibrating signal is an output port of said microwave power dividing and phase transforming means.

22. The apparatus of claim 19 further comprising means for controlling said switching means to periodically switch the connections to said phase comparator means.

23. The apparatus of claim 20 wherein the microwave energy is received in pulses and further comprising means responsive to the receipt of pulses of microwave energy for controlling said switching means to switch the connections to said phase comparator means.

24. The apparatus of claim [18] *32* wherein said calibrating means comprises a source of at least one coded combinations of binary level signals representing a calibrating value, first storing means for storing the coded combinations of binary level signals generated by said phase comparator means, and arithmetic means for modifying the contents of said first storing means in view of the coded combination of binary level signals from said source to produce a further coded combination of binary level signals.

25. The apparatus of claim 24 wherein said source is an addressable memory means storing a plurality of coded combinations of binary level signals, and means for selectively addressing said addressable memory means.

[26. The apparatus of claim 1 further comprising calibrating means.]

27. The apparatus of claim [26] *32* wherein said phase comparator means comprises means for generating coded combinations of bits representing the differences in phase of received signals and wherein said calibrating means comprises a source of a coded combination of bits representing calibrating information, said source including first storing means for storing at least one coded combination of bits representing calibrating information, and arithmetic means for modifying a coded combination of bits generated by said phase comparator means in view of the contents of said first storing means.

28. The apparatus of claim 27 further comprising a further storing means for storing a coded combination of bits and a controlled switching means having first and second inputs and outputs connected to said phase comparator means, and said source of a coded combination of bits representing calibrating information comprises a source of a calibrating signal, in-phase power dividing means having an input connected to said source of a calibrating signal and having m-output means, said switching means alternately connecting said second connecting means, connected to the second inputs thereof, or said m-output means connected to the first inputs thereof, to the inputs of said phase comparator means, said further storing means storing the coded combinations of bits generated by said phase comparator means when said switching means connects said second connecting means to the inputs of said phase comparator means, said first storing means storing the coded combination of bits generated by said phase comparator means when said switching means connects said m-output means to said phase comparator means, and said arithmetic means modifying the contents of said further storing means in view of the contents of said first storing means to produce a further coded combination of bits.

29. The apparatus of claim 27 wherein said calibrating means comprises a source of a coded combination of bits representing calibrating information, said source including storing means for storing at least one coded combination of bits representing calibrating information.

30. The apparatus of claim 29 wherein said storing means comprises a memory having a plurality of addressed storage registers, each of said register storing a different coded combination of bits and means for selectively addressing said storage registers.

31. Apparatus for generating a representation of the bearing of a source of microwave energy comprising: an antenna array means having N antenna elements equispaced about an arc of a circle greater than 180° in a plane for receiving microwave energy, where N is an integer; microwave power dividing and phase transforming means having N input ports and a set of output ports; first connecting means for connecting each of the N input ports to a different one of said antenna elements, N being an integer greater than 4; n two-input port phase comparator means, each of said phase comparator means giving an indication of the phase difference between the signals arriving at their respective input ports, n being an integer less than N/2; second connecting means for connecting the input ports of each of said phase comparator means to a different pair of output ports of said microwave power dividing and phase transforming means; ambiguity resolving means connected to said n phase comparator means for processing said indications of the phase differences to give a multidigit representation of the bearing of a source of microwave energy; and calibrating means for compensating for phase errors introduced by said phase comparator means.

*32. Apparatus for generating a representation of the bearing of a source of microwave energy comprising:*

*An antenna array means having N antenna elements equispaced about an arc of a circle greater than 180 degrees in a plane for receiving microwave energy, where N is an integer greater than 4;*

*Microwave power dividing and phase transforming means having N input ports and a set of output ports;*

*First connecting means for connecting each of the N input ports to a different one of said antenna elements;*

*A processing means comprising n two-input port phase comparator means, each of said phase comparator means giving a coded combination of binary level signals representing an indication of the phase difference between the signals arriving at their respective input ports, n being an integer greater than 1 and less than N/2, and second connecting means for connecting the input ports of each of said phase comparator means to a different pair of output ports of said microwave power dividing and phase transforming means; and*

*Ambiguity resolving means connected to said n phase comparator means for converting the coded combinations of binary level signals received in parallel from all said phase comparator means into a multi-digit representation of the bearing of a source of microwave energy, said ambiguity resolving means further comprising calibrating means for initially modifying the coded combinations of binary level signals in accordance with the phase errors introduced by said processor means.*

* * * * *